United States Patent [19]

Matsuda

[11] Patent Number: 4,709,341
[45] Date of Patent: Nov. 24, 1987

[54] SELF-MONITORING SYSTEM FOR DETECTING ERROR AT OUTPUT PORT DURING COLD START OF MICROPROCESSOR SYSTEM

[75] Inventor: Toshiro Matsuda, Sagamihara, Japan

[73] Assignee: Nissan Motor Company, Limited, Yokohama, Japan

[21] Appl. No.: 670,011

[22] Filed: Nov. 9, 1984

[30] Foreign Application Priority Data

Nov. 14, 1983 [JP] Japan .................... 58-212537

[51] Int. Cl.⁴ .................. G06F 11/22; G06F 15/50
[52] U.S. Cl. ...................... 364/550; 303/92; 303/110; 364/426; 371/16; 371/62
[58] Field of Search .......... 364/550, 424, 426; 371/9, 16, 62, 29, 66, 20; 303/92, 95, 110

[56] References Cited

U.S. PATENT DOCUMENTS

| | | | |
|---|---|---|---|
| 4,096,990 | 6/1978 | Strelow | 371/16 |
| 4,125,763 | 11/1978 | Drabing et al. | 371/20 |
| 4,317,167 | 2/1982 | Hartig et al. | 371/9 X |
| 4,472,778 | 9/1984 | Davis et al. | 364/426 |
| 4,499,543 | 2/1985 | Matsuda | 364/426 |
| 4,546,437 | 10/1985 | Bleckmann et al. | 364/426 |
| 4,597,052 | 6/1986 | Matsuda | 364/200 X |

Primary Examiner—Errol A. Krass
Assistant Examiner—Kevin J. Teska
Attorney, Agent, or Firm—Schwartz, Jeffery, Schwaab, Mack, Blumenthal & Evans

[57] ABSTRACT

A self-monitor system for a microprocessor performs self-checking during cold-start of the microprocessor. Self-checking is performed by applying a dummy load to a specific output port, and detecting the signal level at a checking port connected to the specific output port so that the output level at the check port coincides with the dummy load applied to the specific output port within a predetermined allowable time lag. An alarm is produced and a fail-safe operation is carried out if the signal level at the check port coincident with the dummy load is not detected within a given period of time after the allowable time lag.

14 Claims, 6 Drawing Figures

SELF-MONITORING SYSTEM FOR DETECTING ERROR AT OUTPUT PORT DURING COLD START OF MICROPROCESSOR SYSTEM

BACKGROUND OF THE INVENTION

The present invention relates generally to a self-monitoring system for a microprocessor system, which checks itself for accuracy during so-called "cold start", especially accuracy of operations at the output port of the microprocessor. More particularly, the invention relates to a cold start self-monitor system in which hard errors at the output ports can be detected by monitoring load signal levels applied to dummy loads.

In the recent years, various microprocessors have become available for controlling and/or operating various automotive devices, such as engines, brake systems, suspension system, etc. When controlling automotive engines, brake systems or suspension systems, each of which are fundamental to the safety and reliability of vehicle driving, microprocessors must be reliable enough to accurately control and/or operate the vehicle devices. All errors must be avoided or at least detected as soon as they occur.

Various self-monitoring systems and fail-safe systems for the microprocessors applied to controlling and/or operating automotive devices have been proposed and developed to ensure accuracy of microprocessor operation and the earliest possible detection of error in the microprocessor.

The present invention is to provide a newly developed self-monitoring system for a microprocessor which can detects hard errors at the output port to verify accurate microprocessor operation.

SUMMARY OF THE INVENTION

Therefore, it is an object of the invention to provide a self-monitoring system for a microprocessor system, which can detect errors at the output port of the microprocessor during cold start and produce an alarm when an error is detected.

Another object of the present invention is to provide a self-monitoring system for a microprocessor system which executes a self-monitoring program triggered during cold start.

In order to accomplish the above-mentioned and other objects, a self-monitoring system, in accordance with the present invention, consists of a microprocesor which is programmed to execute a self-monitoring program for checking each output port thereof during cold start. Self-check is carried out by applying a dummy load of a predetermined level to each of a plurality of check ports associated with a corresponding output port. After a given period of time, the output level at the check port is compared to a preset level which is obtainable when the corresponding output port is operating properly. An alarm signal is produced when the output level at the check port does not match the preset level.

In applications wherein the microprocessor controls and/or operates automotive devices such as internal combustion engines, brake systems for performing antiskid control, suspension systems for controlling vehicle height and/or damping characteristics, the cold start self-check may be performed in response to the onset of engine cracking which represents the beginning of all control operations of the microprocessor.

According to one aspect of the invention, a self-monitor system for a microprocessor system comprises a specific output port incorporated in the microprocessor system and connected to a load to be controlled by an output of the microprocessor, a check port electrically connected to the specific output port, first means, associated with the specific output port and responsive to a specific operational condition of the microprocessor to output a unique value through the specific output port, and second means for detecting electrical conditions at the check port and producing an alarm signal when electrical conditions at check port do not indicate output of the unique value through the specific output port within a predetermined allowable time lag after the first means first outputs the unique value through the specific output port.

According to another aspect of the invention, an electronic vehicle device control system with an error-checking feature, comprises a microprocessor for outputting a control signal via a first output terminal to an electrically operated actuator which drives the vehicle device, the microprocessor having a second terminal electrically connected to the first output terminal so that the signal level at the second terminal is indicative of the output signal level at the first output terminal, the microprocessor being programmed to perform the following steps in response to a specific operational state thereof, outputting a predetermined first value through the first output terminal, detecting the signal level at the second terminal and measuring the elapsed time from outputting of said first predetermined value through said first output terminal in which second value at said second terminal is held inconsistent with first value, and producing an alarm when the measured elapsed time exceeds a given reference time.

BRIEF DESCRIPTION OF THE DRAWINGS

The present invention will be understood more fully from the detailed description given herebelow and from the accompanying drawings of the preferred embodiments of the invention, which, however, should not be taken to limit the invention to the specific embodiment or embodiments but are for explanation and understanding only.

In the drawings.

DESCRIPTION OF THE PREFERRED EMBODIMENT

Figure 1:
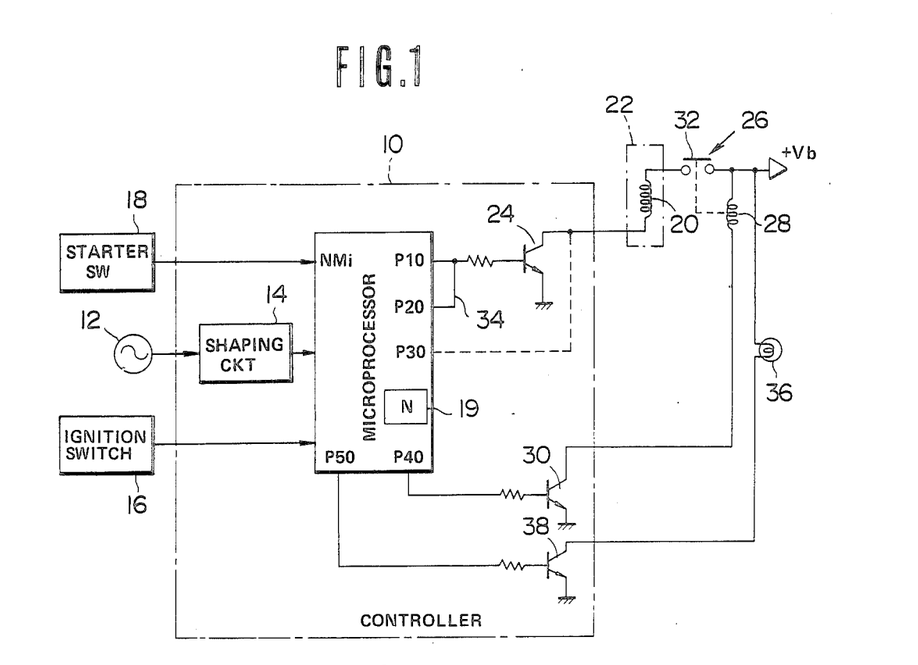
FIG. 1 is a circuit diagram of an anti-skid brake control system including a microprocessor to which the preferred embodiment of a self-monitoring system according to the present invention is applied.

Referring now to the drawings, FIG. 1 shows an anti-skid brake control system as an example of application of a microprocessor system with a self-monitoring system according to the present invention.

Application of microprocessors to automotive anti-skid brake control systems has been described in the Published Japanese Patent Application (Tokkai) No. Showa 57-70758, published on May 1, 1982, and Published Japanese Patent Application (Tokkai) No. Showa 57-110551, published on July 9, 1982. The contents of these two Japanese publications are hereby incorporated by reference for the sake of complete disclosure.

In FIG. 1, a controller 10 is connected to a wheel speed sensor 12 which produces an AC sensor signal with a frequency representative of the angular speed of a vehicle wheel (not shown). A shaping circuit 14 transforms the AC sensor signal from the wheel speed sensor 12 into a train of rectangular pulses with the frequency corresponding to that of the sensor signal. The anti-skid controller 10 comprises a microprocessor programmed to perform anti-skid brake control operations on the basis of the wheel sensor signal from the shaping circuit 14.

In one of typical anti-skid control technique, braking pressure is controlled to increase until wheel acceleration decreases across a predetermined deceleration threshold value, to remain constant at a higher level until wheel slippage relative to vehicle speed exceeds a slippage threshold value, to decrease when wheel slippage exceeds the slippage threshold value until wheel acceleration exceeds a predetermined acceleration threshold value, and to remain constant at a lower level until the wheel speed increases to match the vehicle speed. Processing of the sensor pulse train to obtain necessary control parameters has been illustrated in the U.S. Pat. No. 4,408,290, to Jun KUBO. The contents of the U.S. Pat. No. 4,408,290 is also hereby incorporated by reference for the sake of disclosure. In addition, procedures for deriving anti-skid brake control signal on the basis of obtained control parameters has been disclosed in, for example, the co-pending U.S. patent application Ser. No. 601,326 filed 4/17/86 which corresponds to the European Patent Application No. 84104440.7. The contents of these co-pending applications are also hereby incorporated by reference for the sake of disclosure.

Returning to FIG. 1, the microprocessor 10 has an output port P10 for outputting a control signal to operate an electromagnetic actuator 20 in a pressure control valve 22 in a hydraulic brake system. The pressure control valve 22 operates in response to the control signal by shifting its valve position to one of an APPLICATION mode, in which the braking pressure increases, a HOLD mode, in which the braking pressure is held constant, and a RELEASE mode in which the braking pressure decreases. The output port P10 is connected to the base electrode of a power transistor 24. In the shown embodiment, the operational mode of the pressure control valve 22 is determined by the current applied to the actuator. For instance, when the APPLICATION mode is selected, the current through the actuator 20 is zero, whereas when RELEASE mode is selected, several amperes, e.g. 5A must be conducted through the actuator 20. In the HOLD mode, a current between that required in the APPLICATION mode and that required in the RELEASE mode, e.g. 2A, is applied to the actuator. Therefore, the power transistor 24 controls the current to be supplied to the actuator 20 depending upon the voltage of the control signal applied to its base electrode.

The collector electrode of the power transistor 24 is connected to the actuator 20. The actuator 20 is, in turn, connected to a vehicle battery acting as a power source $+V_b$ through a relay 26. The relay 26 has a relay coil 28 connected to the collector electrode of a transistor 30. The base of transistor 30 is connected to an output port P40 of the microprocessor 10. The microprocessor 10 is adapted to output a HIGH-level signal to the transistor 30 through the output port P40 as long as an ignition switch 16 is closed, i.e. as long as the engine is running. The transistor 30 energizes the relay coil 28 when rendered conductive. As a result, a movable contact 32 of the relay 26 is held closed to close a power supply circuit to the actuator 20.

The output port P10 is also connected to a port P20 which serves as a check port. The voltage level at the check port P20 is indicative of the output level of the output port P10. In addition to the check port P20 connected to the output port P10 through a line 34 in the shown embodiment, it is possible to connect the collector electrode of the power transistor 24 to another port P30 through a line 36 as shown by phantom line in FIG. 1 for additional verification of proper system operation.

In general, the output level at the output port P10 is checked by checking the voltage at the check port P20 according to the procedure illustrated in FIG. 2 which will be described later. If the output of the output port P10 is found to be erroneous, the output level at the output port P40 is held LOW to cut off the transistor 30. As a result, the relay coil 28 is deenergized to break the power supply circuit for the actuator 20. As set forth above, when no current is applied to the actuator 20, the pressure control valve 22 is held in the APPLICATION mode. Therefore, manual brake operation is possible, even when the output of the controller is in error. Another output port P50 is provided for outputting an alarm signal when error of the output level at the output port P10 is detected. Another output port P50 is connected to an error monitor lamp 36 through a transistor 38. The alarm signal from the output port P50 is a HIGH-level signal which renders the transistor 38 conductive and thus supplies power to the error monitor lamp 36, which them emits light to alert the driver.

Figure 2:
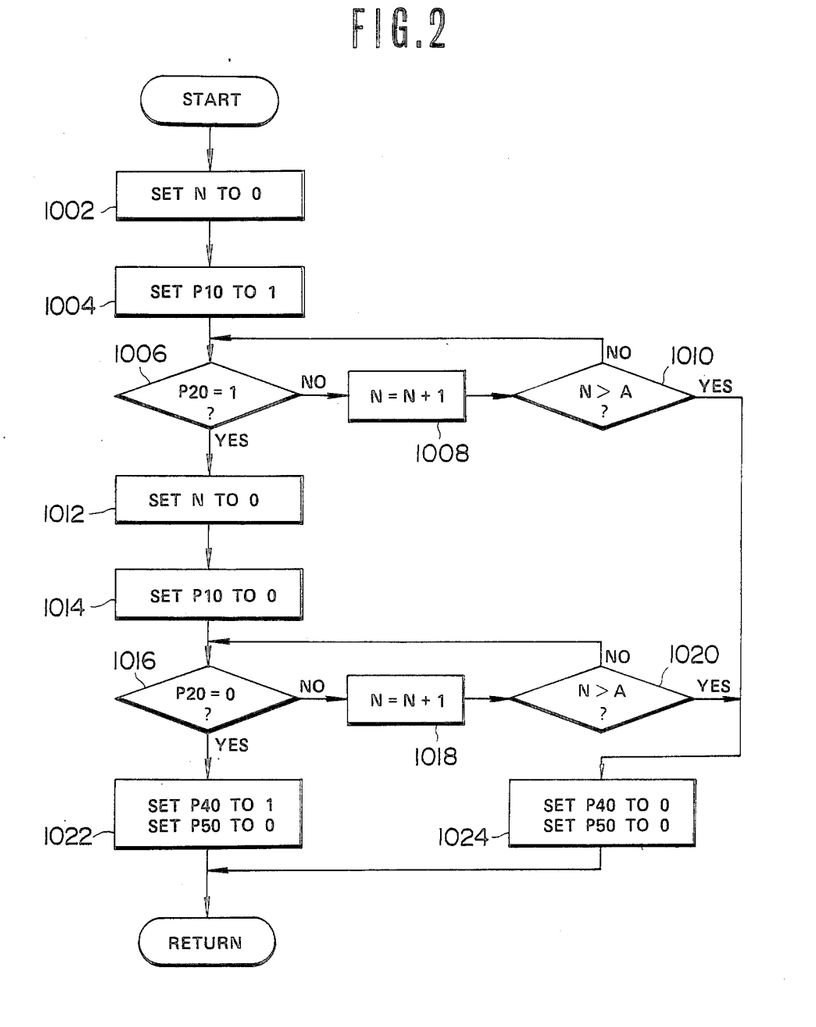
FIG. 2 is a flowchart of a self-monitoring program to be executed by the microprocessor of FIG. 1.

The microprocessor also has a port $\overline{NMi}$ wired to receive a check demand triggering the self-monitoring program of FIG. 2 during cold start of the microprocessor. In the shown embodiment, a starter-switch closure signal from a starter switch 18 is used as the check demand signal. Therefore, when the starter switch is closed to start the engine, the microprocessor is triggered to execute the self-monitoring program.

FIG. 2 diagrammatically illustrates the self-monitoring program to be executed in response to closure of the starter switch 18. At the initial stage of the self-monitoring program, a counter value N in a counter 19 in the microprocessor 10 is reset to zero at a block 1002. Thereafter, a first HIGH-level dummy signal is applied to the output port P10 at a block 1004. Then, the voltage level at the check port P20 is checked at a block 1006, to see if it is HIGH-level, i.e. a logical "1". If not, the counter value N is incremented by 1, at a block 1008. Then the counter value N is compared with a predetermined reference value A at a block 1010. If the counter value N is still less than the reference value A, control returns to the block 1006 to again check the voltage level at the check port P20.

As will be appreciated, the blocks 1006, 1008 and 1010 constitutes a loop which is repeatedly executed until the logic level of the check port becomes 1 or the counter value N reaches the reference value A. This loop allows for the lag time in the voltage rise at the check port in response to application of the first dummy signal to the output port P10. That is checking for the counter value N to exceed the reference value is in effect a way of checking for output port operation within an anticipated time limit.

After a voltage level at the check port P20 consistent with that of the first dummy signal applied to the output port P10, is detected at the block 1006, the counter 19 is again reset to zero at a block 1012. Then, a second LOW-level dummy load (=0) is applied to the output port P10, at a block 1014. The voltage level at the check port P20 is again checked at a block 1016. If the voltage at the check port P20 is not consistent with that of the second dummy load, then the counter 19 is incremented by 1 at a block 1018. The counter value N is then compared at a block 1020 with the reference value A which serves as a time limit as before. The blocks 1016, 1018 and 1020 constitute a second time-lag loop anticipating the rise in voltage at the check port P20 after application of the second dummy load to the output port P10. Similarly to the loop of the blocks 1006, 1008 and 1010, this loop of the blocks 1016, 1018 and 1020 is repeated until the voltage at the check port P20 becomes consistent with the second dummy signal or the time limit is exceeded.

After a voltage level consistent with the second dummy load is detected at the block 1016, the output level at the output port P40 is set to 1 and the output level at the output port P50 is set to 0, at a block 1022. On the other hand, if the time limit is exceeded at either block 1010 or block 1020, then the output level at the output port P40 is set to 0 and the output level at the output port P50 is set to 1.

Figure 3:
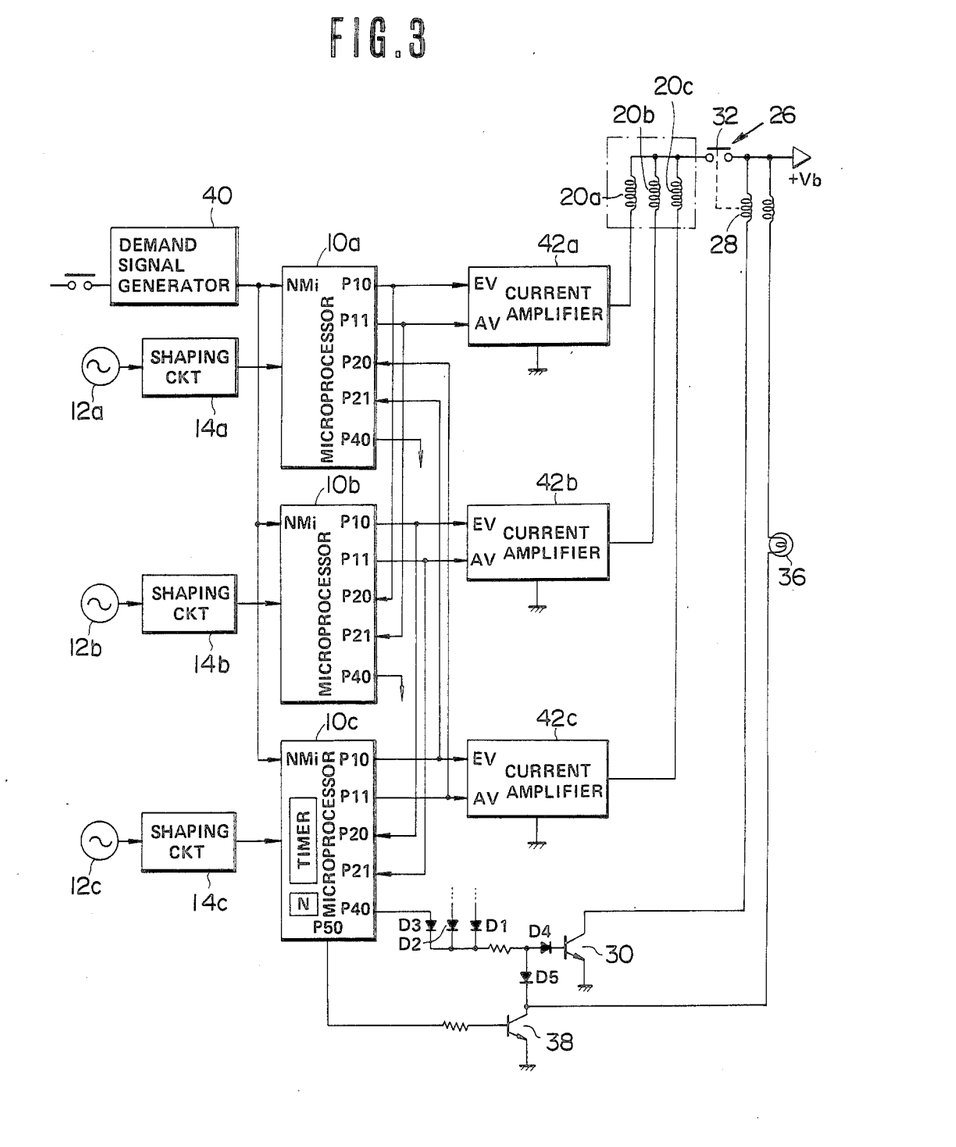
FIG. 3 is a block diagram of another anti-skid brake control system, which employs a plurality of microprocessors independently controlling brake circuits for corresponding vehicle wheel, to which the second embodiment of a self-monitoring system according to the present invention is applied.

FIG. 3 shows another anti-skid brake control system to which another preferred embodiment of self-monitoring system is applied. As will be appreciated from FIG. 3, three microprocessors 10a, 10b and 10c are employed. The microprocessors 10a and 10i b are adapted to perform anti-skid brake control for the respectively corresponding left- and right-front brake systems, while microprocessor 10c performs anti-skid brake control for rear brake system.

An anti-skid control system adapted to perform anti-skid control independently for different brake systems has been disclosed and illustrated in the co-pending U.S. patent application Ser. No. 601,295 filed 4/17/84 which corresponds to German Patent Application No. P 34 17 144.4. The contents of the above-identified co-pending application is hereby incorporated by reference for the sake of disclosure.

The microprocessors 10a, 10b and 10c are connected to wheel speed sensors 12a, 12b and 12c through shaping circuits 14a, 14b and 14c respectively disposed in the corresponding connecting lines. Each microprocessor 10a, 10b and 10c has a port $\overline{NMi}$ connected to a single demand signal generator 40 which is active in response to closure of the starter switch 18. On the other hand, each of the microprocessors 10a, 10b and 10c is provided with two output ports P10 and P11 respectively outputting an inlet signal (EV) and an outlet signal (AV). The inlet signal (EV) and outlet signal (AV) in combination specify the operational mode of the pressure control valve in the corresponding brake system. This method of anti-skid brake control using EV and AV signals has been disclosed in U.S. Pat. No. 3,637,264, to Leiber et al. The contents of this U.S. Patent is hereby incorporated by reference for the sake of disclosure.

In practice, the operational mode of the pressure control valve is determined by the combination of EV and AV signals according to the following table:

| Mode | EV | AV |
| --- | --- | --- |
| APPLICATION | 0 (LOW) | 0 (LOW) |
| HOLD | 1 (HIGH) | 0 (LOW) |
| RELEASE | 1 (HIGH) | 1 (HIGH) |

Each pair of output ports P10 and P11 is connected to a corresponding current amplifier 42a, 42b and 42c which is, in turn, connected to the corresponding actuator 20a, 20b and 20c. The current amplifiers 42a, 42b and 42c produce currents which depend upon the combination of the EV and AV signals. In practice, the current output by the current amplifiers 42a, 42b and 42c in the APPLICATION mode is 0A, in the HOLD mode is 2A and in the RELEASE mode is 4A.

Figure 4:
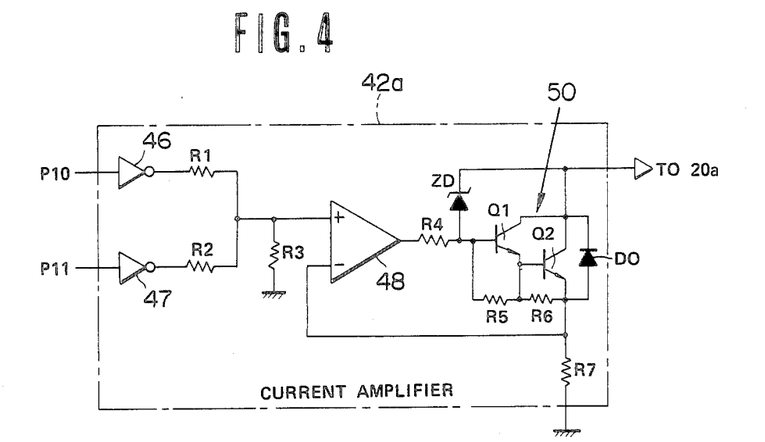
FIG. 4 is a circuit diagram of an current amplifier in the anti-skid brake control system of FIG. 3.

FIG. 4 shows the circuitry of the current amplifiers 42a, 42b and 42c in detail. Since the current amplifiers 42a, 42b and 42c have substantially identical circuitry, only the current amplifier 42a is shown.

In FIG. 4, the output ports P10 and P11 of the microprocessor 10a is connected to inverters 44 and 46 of the current amplifier 42a. The outputs at the output ports P10 and P11 are inverted by the inverters 44 and 46. The inverters 44 and 46 are connected to each other through resistors $R_1$ and $R_2$, whereby the inverted values are added. The positive input terminal of an operational amplifier 48 receives the resulting combined voltage further divided by another grounded resistor $R_3$ connected to the parallelly connected resistors $R_1$ and $R_2$. The negative input terminal of the operational amplifier 48 receives a feedback signal from a Darlington amplifier 50 which consists of transistors $Q_1$ and $Q_2$.

The output terminal of the operational amplifier 48 is connected to the base electrode of the transistor $Q_1$ in the Darlington amplifier 50 via a resistor $R_4$. In addition, the output of the operational amplifier 48 is connected to the base electrode of the transistor $Q_2$ via voltage divider 52 consisting of resistors $R_5$ and $R_6$. A diode D0 is provided for surge prevention and a Zenor diode ZD is provided for regulating the potential at the collector electrodes of the transistors $Q_1$ and $Q_2$. In addition, the collector potential is affected by the feedback of the potential at the end of a resistor $R_7$ to the negative input of the operational amplifier 48.

Referring again to FIG. 3, as in the first embodiment, the actuators 20a, 20b and 20c are connected via the relay 26 to the vehicle battery acting as the power source Vb. The relay coil 28 is connected to the collector electrode of the transistor 30. The base electrode of the transistor 30 is connected to the output ports P40 of each of the microprocessors 10a, 10b and 10c via respective diodes D1, D2, D3, and finally via diode D4. The output level at the output ports P40 is usually HIGH while the ignition switch is closed. In other words, the microprocessors 10a, 10b and 10c apply HIGH-level outputs to the base electrode of the transistor 30 as soon as power supply starts. The transistor 30 thus energizes the relay coil 28 to hold the movable contact 32 of the relay 26 closed, thus connecting the actuators 20a, 20b and 20c to the power source Vb.

Each of the microprocessors 10a, 10b and 10c is also provided with check ports P20 and P21. The check ports P20 and P21 of the microprocessor 10a are connected to the output ports P10 and P11 of the microprocessor 10c. Similarly, the check ports P20 and P21 of the microprocessor 10b are connected to the output ports P10 and P11 of the microprocessor 10a. The check ports P20 and P21 of the microprocessor 10c are connected to the output ports P10 and P11 of the microprocessor 10b. The microprocessor 10c is also provided with an alarm port P50, the output level of which goes HIGH to illuminate the error monitor lamp 36 if any of the output ports is found to be faulty.

The microprocessors are so arranged to perform mutual error monitoring. In other words, the system consisting of the three microprocessors performs a system self-check by way of microprocessor inter-checking, rather than by self-monitoring of individual microprocessors. This has the advantage of ensuring detection of error even if one of the microprocessors should become entirely inoperative.

Figure 5A:
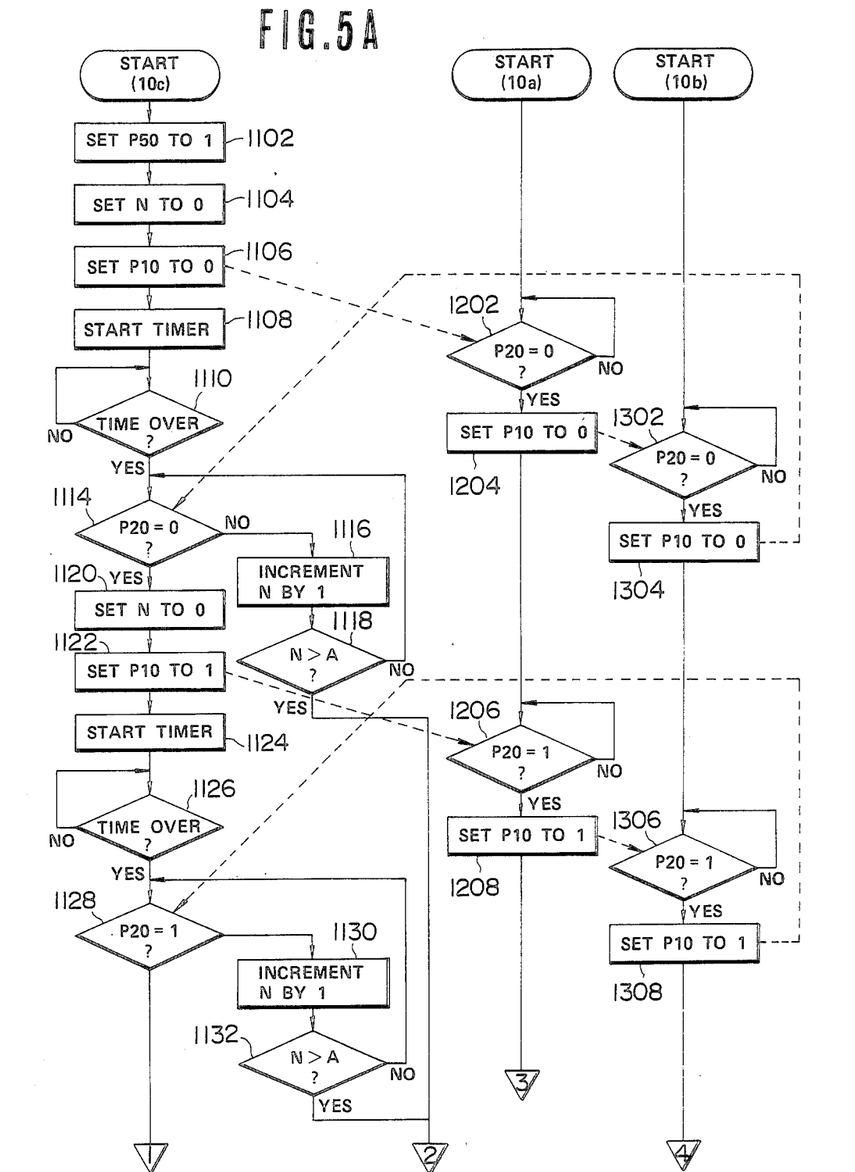
FIGS. 5A and 5B are flowcharts of a set of interdependent self-monitoring programs to be executed by the microprocessors in the anti-skid brake control system of FIG. 3.
Figure 5B:
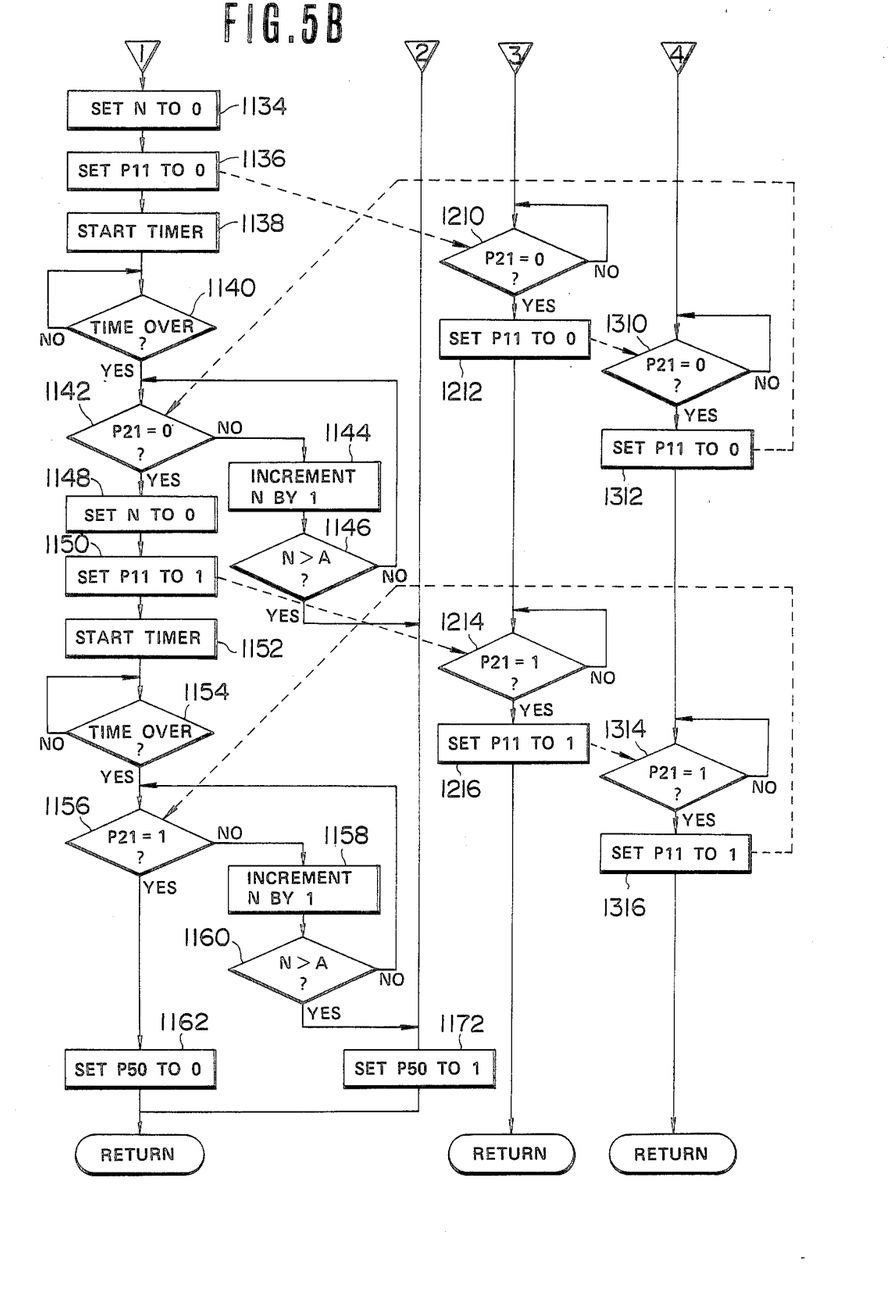

FIG. 5 is a flowchart of a set of interdependent programs executed by the microprocessors 10a, 10b and 10c. As will be appreciated herefrom, the microprocessors 10a and 10b execute essentially identical programs and the microprocessor 10c executes a program similar to that of the foregoing first embodiment.

Each of the programs in triggered by a HIGH-level input at the port $\overline{NMi}$, which is input in response to closure of the starter switch. After starting execution of the programs, the microprocessors 10a and 10b remain in a stand-by state cycling at blocks 1202 and 1302 respectively. The output port P50 in the microprocessor 10c is concurrently set to 1 at a block 1102 of the program executed by the microprocessor 10c. After this, the counter 19 in the microprocessor 10c is set to zero at a block 1104 and the output level at the output port P10 of the microprocessor 10c is set to 0 at a block 1106. At subsequent block 1108, a timer 21 in the microprocessor 10c starts measurement of elapsed time.

On the other hand, the microprocessor 10a is triggered by execution of the block 1106 to finally exit the block 1202. In the block 1202, the voltage level at the check port P20 of the microprocessor 10a is checked. This block 1202 is repeated until a "0" logic level at the check port P20 is detected. After detecting the "0" logic level at the check port P20, the microprocessor 10a sets the output level of its own output port P10 to 0. Execution of this block 1204 allows the microprocessor 10b to exit the block 1302. In the block 1302, the voltage level of the check port P20 of the microprocessor 10b is checked. As in the block 1202, this block 1302 is repeated until the ligic level at the check port P20 of the microprocessor 10b is 0. When a "0" logic level at the check port P20 is detected, the output level at the output port P10 of the microprocessor 10b is set to 0 at a step 1304.

Elapsed time during execution of the sequence of program steps from the block 1106 to 1304 is checked at a block 1110 in the program executed by the microprocessor 10c. After elapsed time exceeds a predetermined period of time at the block 1110, the microprocessor 10c exits the loop at the block 1110 and advances to a block 1114. The predetermined time will be slightly longer than the longest possible overall time lag in the output levels of the check ports P20 of the microprocessors 10a and 10b. This step serves to allow the output ports P10 of all of the microprocessors to settle to their lower output levels.

At block 1114, the voltage level at the check port P20 of the microprocessor 10c is checked. If the logic level at the check port P20 is not 0, the counter value N is incremented by 1 at a block 1116. Then, the counter value N is compared with a given reference value A which serves as a time limit, at a block 1118. The blocks 1114 to 1118 loop until the logic level at the check port P20 of the microprocessor 10c drops to 0 or the counter value N exceeds the reference value A.

In the former case, control passes to a block 1120 wherein the counter value N is reset to 0. Thereafter, the output level at the output port P10 of the microprocessor 10c is set to 1 at a block 1122. The timer 21 is then re-started to measure elapsed time at a block 1124.

On the other hand, in the latter case, control of the microprocessor 10c jumps to the block 1112 wherein the output level at the outport port P50 is set to 1.

Execution of the block 1122 allows the microprocessor 10a to exit a looping block 1206. In the block 1206, the voltage level at the check port P20 of the microprocessor 10a is checked. This block 1206 is repeated until a logic level of "1" at the check port P20 is detected. After detecting a logic level of "1" at the check port P20, the microprocessor 10a sets the output level of its own output port P10 to 1 at a block 1208. Execution of this block 1208 allows the microprocessor 10b to exit a looping block 1306. In the block 1306, the voltage at the check port P20 of the microprocessor 10b is checked. As at the block 1206, this block 1306 is repeated until a logic level of "1" is achieved at the check port P20 of the microprocessor 10b. When logic level 1 at the check port P20 is detected, the output level at the output port P10 of the microprocessor 10b is reset to 0 at a step 1308.

Elapsed time during execution of the sequence of program steps from the block 1122 to 1308 is checked at a block 1126 in the program executed by the microprocessor 10c. After elapsed time exceeds the predetermined period of time at the block 1126, the microprocessor 10c exits the loop at the block 1126 and advances to a block 1128. At the block 1128, the voltage level at the check port P20 of the microprocessor 10c is checked. If the logic level at the check port P20 is not 1, the counter value N is incremented by 1 at a block 1130. Then, the counter value N is compared with the reference value A at a block 1132. The blocks 1128 to 1132 loop until a logic level of 1 is achieved at the check port P20 of the microprocessor 10c or the counter value N exceeds the reference value A.

In the former case, control passes to a block 1134 wherein the counter value N is reset to 0. Thereafter, the output level at the output port P11 of the microprocessor 10c is set to 0 at a block 1136. The timer 21 is then re-started to measure elapsed time at a block 1138.

On the other hand, in the latter case, control of the microprocessor 10c jumps to the block 1112 wherein the output level at the output port P50 is set to 1.

Execution of the block 1136 allows the microprocessor 10a to exit a block 1210 subsequent to the block 1208. In the block 1210, the voltage level at the check port P21 of the microprocessor 10a is checked. This block 1210 is repeated until a logic level of 0 is detected at the check port P21. After detecting a logic level of 0 at the check port P21, the microprocessor 10a sets the output level of its own output port P11 to 0 at a block 1212. Execution of this block 1212 allows the microprocessor 10b to execute a block 1310 subsequent to block 1308. In the block 1310, the voltage level of the check port P21 of the microprocessor 10b is checked. As at the block 1310, this block 1310 is repeated until the logic level at the check port P21 of the microprocessor 10b drops to 0. After a logic level of 0 at the check port P21 is detected, the output level at the output port P11 of the microprocessor 10b is set to 0 at a step 1312.

Elapsed time during execution of the sequence of program steps from the block 1136 to 1312 is checked by a block 1140 in the program executed by the microprocessor 10c. After elapsed time exceeds a predetermined period of time at the block 1140, the microprocessor 10c exits the loop at the block 1140 and advances to a block 1142. At the block 1142, the logic level at the check port P21 of the microprocessor 10c is checked. If the logic level at the check port P21 is not 0, the counter value N is incremented by 1 at a block 1144. Then, the counter value N is compared with the reference value A at a block 1146. The blocks 1142 to 1146 loop until a logic level of 0 is achieved at the check port P21 of the microprocessor 10c or the counter value N exceeds the reference value A.

In the former case, control passes to a block 1148 wherein the counter value N is reset to 0. Thereafter, the output level at the output port P11 of the microprocessor 10c is set to 1 at a block 1150. The timer 21 is then re-started at a block 1152 to measure elapsed time.

On the other hand, in the latter case, control of the microprocessor 10c jumps to the block 1112 wherein the output level at the output port P50 is set to 1.

Execution of the block 1150 allows the microprocessor 10a to exit a looping block 1214. In the block 1214, the logic level at the check port P21 of the microprocessor 10a is checked. This block 1214 is repeated until a logic level of 1 at the check port P21 is detected. After detecting a logic level of 1 at the check port P21, the microprocessor 10a sets the output level of its own output port P11 to 1 at a block 1216. Execution of this block 1216 allows the microprocessor 10b to exit a loop at block 1314. In the block 1314, the output level of the check port P21 of the microprocessor 10b is checked. This block 1314 is repeated until the logic level at the check port P21 of the microprocessor 10b reaches 1. When a logic level of 1 at the check port P21 is detected, the output level at the output port P11 of the microprocessor 10b is set to 1 at a step 1316.

Elapsed time during execution of the sequence of program steps from the block 1150 to 1316 is checked by a block 1154 in the program executed by the microprocessor 10c. After elapsed time exceeds a predetermined period of time at the block 1154, the microprocessor 10c exits the loop at the block 1154 and advances to a block 1156. At the block 1156, the logic level at the check port P21 of the microprocessor 10c is checked. If the logic level at the check port P21 is not 1, the counter value N is incremented by 1 at a block 1158. Then, the counter value N is compared with the reference value A at a block 1160. The blocks 1156 to 1160 loop until a logic level of 1 is achieved at the check port P21 of the microprocessor 10c or the counter value N exceeds the reference value A.

Similar earlier parts of these program, if the counter value N reaches the reference value, control jumps to the block 1112 to illuminate the error monitor lamp 36. On the other hand, if the voltage level of the check port P21 of the microprocessor 10c goes HIGH before the counter value N reaches the reference value A, the output level of the output port P50 is reset to 0 at a block 1162. This terminates illumination of the error monitor lamp 36.

Therefore, during the self-checking operation, the driver can recognize when the self-check is over by watching the error monitor lamp 36 which should turn off within a predetermined period of time if all of the output ports are OK. On the other hand, the driver can recognize that at least one of the output ports is faulty when the error monitor lamp 36 remains on for longer than the predetermined period of time.

As an alternative, the error monitor lamp may flash on and off to indicate failure of one of the microprocessors. This would help distinguish between self-check and error indication. Additionally, in another approach, the error monitor lamp 36 may be turned on briefly to indicate the beginning of checking state. These modifications may be applied to the second embodiment. Any other modifications and embodiments accomplishing the same or similar effects should be considered to be within the scope of the appended claims.

What is claimed is:

1. A self-monitor system for a microprocessor system comprising:
   a specific output port incorporated in said microprocessor system and connected to a load to be controlled by an output of the microprocessor;
   a check port electrically connected to said specific output port;
   first means, associated with said specific output port and responsive to a specific operational condition of the microprocessor to output a unique value through said specific output port; and
   second means for detecting electrical conditions at said check port and producing an alarm signal when electrical conditions at said check port do not indicate output of said unique value through said specific output port within a predetermined allowable time lag after said first means first outputs said unique value through said specific output port.

2. The self-monitor system as set forth in claim 1, wherein said unique value is a binary value, and said check port is at a specific voltage when said unique value is being output.

3. The self-monitor system as set forth in claim 2, wherein said check port is directly connected to said specific output port so that the specific voltage appears at both of said ports while said unique value is being output through said specific output port.

4. The self-monitor system as set forth in claim 3, wherein said specific operating condition is a cold-start state of the microprocessor system.

5. The self-monitor system as set forth in claim 4, wherein said microprocessor is adapted to control a vehicular device mounted in an automotive vehicle, and said first means is connected to a starter switch of the vehicle and detects the cold-start when said starter switch is closed.

6. The self-monitor system as set forth in claim 5, which further comprises third means, responsive to said alarm signal, for disabling said microprocessor and enabling manual control of said vehicular device.

7. The self-monitor system as set forth in claim 6, wherein said vehicular device is a pressure control valve in a hydraulic brake control system, which valve is controlled to adjust braking pressure so as to prevent a vehicular wheel from locking, and said third means disconnects said pressure control valve from a power source in response to said alarm signal.

8. The self-monitor system as set forth in claim 5, in which said microprocessor is associated with a vehicular brake system which performs anti-skid control.

9. The self-monitor system as set forth in claim 5, which further comprises an error indicator activated in response to said alarm signal.

10. An electronic vehicle device control system with an error-checking feature, comprising:

a microprocessor for outputting a control signal via a first output terminal to an electrically operated actuator which drives said vehicle device, said microprocessor having a second terminal electrically connected to said first output terminal so that the signal level at said second terminal is indicative of the output signal level at said first output terminal, said microprocessor being programmed to perform the following steps in response to a specific operational state thereof:

outputting a predetermined first value through said first output terminal;

detecting the signal level at said second terminal and measuring the elapsed time from outputting said first predetermined value through said first output terminal, in which a second value at said second terminal is held inconsistent with said first value; and producing an alarm when the measured elapsed time exceeds a given reference time.

11. The control system as set forth in claim 10, wherein said microprocessor is further programmed to delay execution of said detecting step by a predetermined period of time in order to allow the electrical conditions at said second terminal to achieve a stable state.

12. The control system as set forth in claim 11, wherein said microprocessor is further programmed to disable said actuator at the same time it produces the alarm.

13. The control system as set forth in claim 10, which comprises a plurality of microprocessors each having said first output terminals connected to corresponding actuators of vehicle devices to be controlled, said first output terminal of each microprocessor being connected to a second terminal of another microprocessor so that the signal level at the second terminal of each microprocessor is indicative of the output signal level of the output terminal of the corresponding other microprocessor.

14. The control system as set forth in claim 13, wherein one of the microprocessors executes a master program including steps for measurement of elapsed time and the other microprocessors execute sub-programs for checking the signal level at the corresponding second terminal and outputting signals through the corresponding first output terminal, said master program checking the elapsed time required for execution of said sub-programs.

* * * * *